US006384118B1

(12) United States Patent
Hergenrother et al.

(10) Patent No.: US 6,384,118 B1
(45) Date of Patent: May 7, 2002

(54) PROCESSABILITY OF SILICA-FILLED RUBBER STOCKS

(75) Inventors: William L. Hergenrother, Akron; Ashley S. Hilton, Massillon; William M. Cole, Clinton, all of OH (US)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 09/961,710

(22) Filed: Sep. 24, 2001

Related U.S. Application Data

(62) Division of application No. 09/724,130, filed on Nov. 28, 2000, which is a division of application No. 08/893,864, filed on Jul. 11, 1997, now Pat. No. 6,221,943.

(51) Int. Cl.[7] .............................................. C08L 5/24
(52) U.S. Cl. ....................................... 524/265; 524/318
(58) Field of Search .................................. 524/265, 318

(56) References Cited

U.S. PATENT DOCUMENTS

| | | | |
|---|---|---|---|
| 3,627,723 A | 12/1971 | Kealy et al. | 260/41.5 R |
| 3,717,600 A | 2/1973 | Dalhuisen et al. | 260/23 H |
| 3,737,334 A | 6/1973 | Doran | 106/288 Q |
| 3,768,537 A | 10/1973 | Hess et al. | 152/330 |
| 3,873,489 A | 3/1975 | Thurn | 260/33.6 AQ |
| 3,881,536 A | 5/1975 | Doran, Jr. et al. | 152/330 |
| 3,884,285 A | 5/1975 | Russell et al. | 152/330 R |
| 3,923,712 A | 12/1975 | Vickery | 260/28.5 B |
| 3,938,574 A | 2/1976 | Burmester et al. | 152/330 R |
| 3,978,103 A | 8/1976 | Meyer-Simon et al. | 260/448.8 R |
| 4,029,513 A | 6/1977 | Vessey et al. | 106/482 |
| 4,076,550 A | 2/1978 | Thurn et al. | 106/288 Q |
| 4,143,027 A | 3/1979 | Sollman et al. | 260/42.15 |
| 4,179,537 A | 12/1979 | Rykowski | 427/387 |
| 4,201,698 A | 5/1980 | Itoh et al. | 260/3 |
| 4,229,333 A | 10/1980 | Wolff et al. | 260/23.7 M |
| 4,297,145 A | 10/1981 | Wolff et al. | 106/308 Q |
| 4,431,755 A | 2/1984 | Weber et al. | 523/203 |
| 4,433,013 A | 2/1984 | Pühringer | 427/337 |
| 4,436,847 A | 3/1984 | Wagner | 523/203 |
| 4,463,120 A | 7/1984 | Collins et al. | 524/274 |
| 4,474,908 A | 10/1984 | Wagner | 523/213 |
| 4,482,657 A | 11/1984 | Fischer et al. | 523/334 |
| 4,623,414 A | 11/1986 | Collins et al. | 156/307.5 |
| 4,629,758 A | 12/1986 | Kawaguchi et al. | 524/495 |
| 4,906,680 A | 3/1990 | Umeda et al. | 524/183 |
| 4,937,104 A | 6/1990 | Pühringer | 427/337 |
| 5,057,601 A | 10/1991 | Schiessl et al. | 528/483 |
| 5,066,721 A | 11/1991 | Hamada et al. | 525/102 |
| 5,159,009 A | 10/1992 | Wolff et al. | 524/495 |
| 5,178,676 A | 1/1993 | Lackey et al. | 106/287.14 |
| 5,227,425 A | 7/1993 | Rauline | 524/493 |
| 5,227,431 A | 7/1993 | Lawson et al. | 525/237 |
| 5,317,051 A | 5/1994 | Harashige et al. | 524/210 |
| 5,328,949 A | 7/1994 | Sandstrom et al. | 524/262 |
| 5,336,730 A | 8/1994 | Sandstrom et al. | 525/332.6 |
| 5,426,136 A | 6/1995 | Waddell et al. | 523/200 |

(List continued on next page.)

FOREIGN PATENT DOCUMENTS

| | | |
|---|---|---|
| CA | 2177095 | 5/1996 |
| CA | 2184932 | 3/1997 |
| CA | 2242310 | 1/1999 |
| CA | 2242383 | 1/1999 |
| CA | 2242783 | 1/1999 |
| CA | 2242797 | 1/1999 |
| CA | 2242800 | 1/1999 |
| CA | 2242801 | 1/1999 |
| CA | 2243091 | 1/1999 |
| CH | 299373 | 8/1954 |
| DE | 29 05 977 A | 8/1979 |
| DE | 43 08 311 A | 8/1979 |
| EP | 0 299 074 | 1/1989 |
| EP | 0 447 066 | 9/1991 |
| EP | 0 510 410 | 10/1992 |
| EP | 0 641 824 | 3/1995 |
| EP | 0 677 548 A1 | 7/1995 |
| EP | 0 744 437 A1 | 4/1996 |
| EP | 0 721 971 A1 | 7/1996 |
| EP | 0 754 710 | 1/1997 |
| EP | 0 761 734 | 3/1997 |
| EP | 0 765 904 | 4/1997 |
| EP | 0 767 179 | 4/1997 |
| EP | 0 795 577 A1 | 9/1997 |
| EP | 0 824 131 | 2/1998 |
| EP | 0 864 605 | 9/1998 |
| EP | 0 890 580 | 1/1999 |
| EP | 0 890 587 | 1/1999 |
| EP | 0 890 588 | 1/1999 |
| EP | 0 890 602 | 1/1999 |
| EP | 0 890 603 | 1/1999 |
| EP | 0 890 606 | 1/1999 |
| EP | 0 908 586 | 1/1999 |
| JP | 63-213536 | 9/1988 |
| JP | 1-110999 | 4/1989 |
| JP | 5-51484 | 3/1993 |
| JP | 94106340 | 4/1994 |
| JP | 6-248116 | 9/1994 |
| JP | 7118452 | 5/1995 |
| JP | 7292162 | 11/1995 |
| JP | 8269294 | 10/1996 |
| JP | 8337688 | 12/1996 |
| JP | 9087427 | 3/1997 |
| WO | WO 99/02601 | 1/1999 |

Primary Examiner—Peter D. Mulcahy
(74) Attorney, Agent, or Firm—Meredith Palmer; Barbara Arndt

(57) ABSTRACT

A processable rubber stock is produced by the preparation of a silica-filled, vulcanized elastomeric compound comprising mixing an elastomer with an amorphous silica filler, from 0 to less than about 1% by weight based on said silica filler of bis[3-(triethoxysilyl)propyl]tetrasulfide, an alkylalloxysilane and a cure agent. A further processing aid comprising at least one of an ester of a fatty acid or an ester of a polyol is preferred. The elastomer is preferably a diene monomer homopolymer or a copolymer of at least one diene and at least one monovinyl aromatic monomer. By effecting vulcanization, a vulcanized elastomeric compound is produced containing good physical properties for use as tread stock for a pneumatic tire.

13 Claims, No Drawings

U.S. PATENT DOCUMENTS

| | | | | |
|---|---|---|---|---|
| 5,502,131 | A | 3/1996 | Antkowiak et al. | 526/180 |
| 5,508,333 | A | 4/1996 | Shimizu | 524/424 |
| 5,514,756 | A | 5/1996 | Hsu et al. | 525/332.5 |
| 5,521,309 | A | 5/1996 | Antkowiak et al. | 540/612 |
| 5,552,473 | A | 9/1996 | Lawson et al. | 524/575 |
| 5,569,697 | A | 10/1996 | Ferrandino et al. | 524/492 |
| 5,574,109 | A | 11/1996 | Lawson et al. | 525/280 |
| 5,580,919 | A | 12/1996 | Agostini et al. | 524/430 |
| 5,591,794 | A | 1/1997 | Fukumoto et al. | 524/447 |
| 5,610,221 | A | 3/1997 | Waddell et al. | 524/492 |
| 5,610,227 | A | 3/1997 | Antkowiak et al. | 524/572 |
| 5,610,237 | A | 3/1997 | Lawson et al. | 525/280 |
| 5,616,655 | A | 4/1997 | D'Sidocky et al. | 525/342 |
| 5,659,056 | A | 8/1997 | Hergenrother et al. | 556/401 |
| 5,674,932 | A | 10/1997 | Agostini et al. | 524/430 |
| 5,679,728 | A | 10/1997 | Kawazura et al. | 523/215 |
| 5,686,523 | A | 11/1997 | Chen et al. | 524/547 |
| 5,708,053 | A | 1/1998 | Jalics et al. | 523/200 |
| 5,714,533 | A | 2/1998 | Hatakeyama et al. | 524/140 |
| 5,717,022 | A | 2/1998 | Beckmann et al. | 524/493 |
| 5,719,207 | A | 2/1998 | Cohen et al. | 524/213 |
| 5,723,531 | A | 3/1998 | Visel et al. | 524/496 |
| 5,741,858 | A | 4/1998 | Brann et al. | 525/101 |
| 5,763,388 | A | 6/1998 | Lightsey et al. | 523/212 |
| 5,777,013 | A | 7/1998 | Gardiner et al. | 524/274 |
| 5,780,537 | A | 7/1998 | Smith et al. | 524/493 |
| 5,780,538 | A | 7/1998 | Cohen et al. | 524/494 |
| 5,798,419 | A | 8/1998 | Quiteria et al. | 525/370 |
| 5,804,636 | A | 9/1998 | Nahmias et al. | 524/492 |
| 5,804,645 | A | 9/1998 | Matsuo | 524/575 |
| 5,866,650 | A | 2/1999 | Lawson et al. | 524/572 |
| 5,872,171 | A | 2/1999 | Detrano | 524/492 |
| 5,872,176 | A | 2/1999 | Hergenrother et al. | 524/494 |
| 5,872,178 | A | 2/1999 | Kansupada et al. | 524/496 |
| 5,872,179 | A | 2/1999 | Hubbell | 524/526 |
| 5,877,249 | A | 3/1999 | Lambotte | 524/493 |
| 5,883,179 | A | 3/1999 | Kawazoe et al. | 524/492 |
| 5,886,074 | A | 3/1999 | Sandstrom et al. | 524/291 |
| 5,886,086 | A | 3/1999 | Hubbell et al. | 524/526 |
| 5,898,047 | A | 4/1999 | Howald et al. | 152/209 R |
| 5,912,374 | A | 6/1999 | Agostini et al. | 556/9 |
| 5,914,364 | A | 6/1999 | Cohen et al. | 524/494 |
| 5,916,951 | A | 6/1999 | Nahmias et al. | 524/492 |
| 5,916,961 | A | 6/1999 | Hergenrother et al. | 524/572 |
| 5,916,973 | A | 6/1999 | Zimmer et al. | 525/236 |
| 5,929,149 | A | 7/1999 | Matsuo et al. | 524/262 |
| 6,008,295 | A | 12/1999 | Takeichi et al. | 525/105 |
| 6,022,922 | A | 2/2000 | Bergh et al. | 524/492 |
| 6,046,266 | A | 4/2000 | Sandstrom et al. | 524/492 |
| 6,053,226 | A | 4/2000 | Agostini | 152/209.5 |
| 6,080,809 | A | 6/2000 | Stuhldreher | 524/447 |
| 6,180,710 | B1 | 1/2001 | Hergenrother et al. | 524/494 |
| 6,221,943 | B1 | 4/2001 | Hergenrother et al. | 524/265 |
| 6,228,908 | B1 | 5/2001 | Takeichi et al. | 524/27 |
| 6,252,007 | B1 | 6/2001 | Oziomek et al. | 525/332.6 |
| 6,255,404 | B1 | 7/2001 | Hogan et al. | 525/326.5 |
| 6,279,632 | B1 | 8/2001 | Hogan et al. | 152/450 |

PROCESSABILITY OF SILICA-FILLED RUBBER STOCKS

This application is a Divisional of U.S. Ser. No. 09/724,130, filed Nov. 28, 2000, now allowed, which is a Divisional of U.S. Ser. No. 08/893,864, field Jul. 11, 1997, now U.S. Pat. No. 6,221,943, issued Apr. 24, 2001

TECHNICAL FIELD

The subject invention relates to the processing and vulcanization of diene polymer and copolymer elastomer containing rubber stocks. More specifically, the present invention relates to the processing and vulcanization of diene polymer and copolymer elastomer-containing, silica-filled rubber stocks using a mixture of silanes as processing aids.

BACKGROUND OF THE INVENTION

In the art it is desirable to produce elastomeric compounds exhibiting reduced hysteresis when properly compounded with other ingredients such as reinforcing agents, followed by vulcanization. Such elastomers, when compounded, fabricated and vulcanized into components for constructing articles such as tires, power belts, and the like, will manifest properties of increased rebound, decreased rolling resistance and less heat-build up when subjected to mechanical stress during normal use.

The hysteresis of an elastomer refers to the difference between the energy applied to deform an article made from the elastomer and the energy released as the elastomer returns to its initial, undeformed state. In pneumatic tires, lowered hysteresis properties are associated with reduced rolling resistance and heat build-up during operation of the tire. These properties, in turn, result in lowered fuel consumption of vehicles using such tires.

In such contexts, the property of lowered hysteresis of compounded, vulcanizable elastomer compositions is particularly significant. Examples of such compounded elastomer systems are known to the art and are comprised of at least one elastomer (that is, a natural or synthetic polymer exhibiting elastomeric properties, such as a rubber), a reinforcing filler agent (such as finely divided carbon black, thermal black, or mineral fillers such as clay and the like) and a vulcanizing system such as sulfur-containing vulcanizing (that is, curing) system.

Previous attempts at preparing readily processable, vulcanizable, silica-filled rubber stocks containing natural rubber or diene polymer and copolymer elastomers have focused upon the sequence of adding ingredients during mixing (Bomal, et al., *Influence of Mixing procedures on the Properties of a Silica Reinforced Agricultural Tire Tread*, May 1992), the addition of de-agglomeration agents such as zinc methacrylate and zinc octoate, or SBR-silica coupling agents such as mercapto propyl trimethoxy silane (Hewitt, *Processing Technology of Silica Reinforced SBR, Elastomerics*, pp 33–37, March 1981), and the use of bis[3-(triethoxysilyl)propyl] tetrasulfide (Si69) processing aid (Degussa, PPG).

The use of Si69 processing aid in the formulation of silica-filled rubber stocks has been successful, but generally requires a large amount of the additive, such as 10% by weight based on the weight of silica, in order to be effective.

Precipitated silica has been increasingly used as a reinforcing particulate filler in carbon black-filled rubber components of tires and mechanical goods. Silica-loaded rubber stocks, however, exhibit. relatively poor processability.

The present invention provides a mixture of silanes for use as processing aids for silica-filled rubber stocks, which greatly improve the processability and properties of the formulations and resulting vulcanized product.

SUMMARY OF INVENTION

It is therefore an object of the present invention to provide rubber stock processing aids which improve the processability of formulations of diene polymer elastomers with silica-filler.

It is another object of the present invention to provide a method for reducing the viscosity of silica-filled elastomeric vulcanizable compounds.

It is another object of the present invention to provide a method for enhancing the processability of silica-filled elastomeric vulcanizable compounds.

It is another object of the present invention to provide vulcanizable silica-filled elastomeric compounds having enhanced physical properties The foregoing objects, together with the advantages thereof over the existing art, which shall become apparent from the specification which follows, are accomplished by the invention as hereinafter described and claimed.

The present invention provides a process for the preparation of a silica-filled, vulcanized elastomeric compound comprising: mixing an elastomer with an amorphous silica filler, from 0 to less than about 1% by weight based on said silica filler of bis[3-(triethoxysilyl)propyl]tetrasulfide, an alkylalkoxysilane and a cure agent; and, effecting vulcanization. Preferably, the elastomer is a diene monomer homopolymer or a copolymer of a diene monomer and a monovinyl aromatic monomer.

The present invention further provides a vulcanizable silica-filled compound comprising an elastomer, a silica filler, from 0 to less than about 1% by weight based on said silica filler of bis[3-(triethoxysilyl)propyl]tetrasulfide (Si69), an alkylalkoxysilane and a cure agent. Preferably, the elastomer is styrene butadiene rubber, optionally containing a carbon black filler. The compound is more readily processable during mixing, due to the use of the mixture of silane processing aids.

The present invention further provides a pneumatic tire comprising tread stock vulcanized from the inventive vulcanizable silica-filled compound.

DETAILED DESCRIPTION OF THE PREFERRED EMBODIMENTS

In general, the present invention provides a means to reduce the level of Si69 needed to obtain good physical properties in a cured rubber stock containing silica as a filler. In addition, the present invention further provides maintenance of the processability of the compounded stock, as measured by Mooney viscosity, at the same level as achieved with high levels of Si69.

The present invention utilizes the presence of an alkylalkoxysilane as a silica hydrophobating agent, such that minimal amounts of Si69 are needed to obtain good processability, and yet still give good physical properties. According to the invention, therefore, a less costly silane can be substituted for the majority or all of the Si69 that would be normally used without any loss of processability or properties. Additionally, remilling can be eliminated, and the cure of the rubber stock is not dependent on the high sulfur level present in the Si69.

The silica-hydrophobating agents useful according to the present invention include those alkylalkoxysilanes of the formula $(R_1)_2Si(OR_2)_2$ or $R_1Si(OR_2)_3$, wherein the alkoxy groups are the same or are different; each $R_1$ independently comprising C1 to about C18 aliphatic, about C6 to about C12 cyclo-aliphatic, or about C6 to about C1 aromatic, preferably C1 to about C10 aliphatic, about C6 to about C10 cyclo-aliphatic, or about C6 to about C12 aromatic; and each $R_2$ independently containing from one to about 6 carbon atoms. Representative examples include octyltriethoxy silane, octyltrimethoxy silane hexyltrimethoxy silane, ethyltrimethoxy silane, propyltriethoxy silane, phenyltrimethoxy silane, cyclohexyltrimethoxy silane, cyclohexyltriethoxy silane dimethyldimethoy silane, i-butyltriethoxy silane, and the like. Of these, octyltriethoxysilane is preferred.

According to the present invention, polymerized elastomer is compounded in the rubber stock, e.g., polybutadiene, polyisoprene and the like, and copolymers thereof with monovinyl aromatics such as styrene, alpha methyl styrene and the like, of trienes such as myrcene. Thus, the elastomers include diene homopolymers, A, and copolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Examples of conjugated diene monomers and the like useful in tile present invention include 1,3-butadiene, isoprene, 1,3-pentadiene, 2,3-dimethyl-1,3-butadiene and 1,3-hexadiene, and aromatic vinyl monomers include styrene, α-methylstyrene, p-methylstyrene, vinyltoluenes and vinylnaphthalenes. The conjugated diene monomer and aromatic vinyl monomer are normally used at the weight ratios of about 90:10 to about 55:45, preferably about 80:20 to about 65:35.

Preferred elastomers include diene homopolymers such as polybutadiene and polyisoprene and copolymers such as styrene butadiene rubber (SBR). Copolymers can comprise from about 99 to 20 percent by weight of diene units and from about 1 to about 80 percent by weight of monovinyl aromatic or triene units, totaling 100 percent. The polymers and copolymers of the present invention may have the diene portion with a 1,2-microstructure contents ranging from about 10 to about 80 percent, with the preferred polymers or copolymers having 1,2-microstructure contents of from about 25 to 65 percent. The molecular weight of the polymer that is produced according to the present invention, is preferably such that a proton-quenched sample will exhibit a gum Mooney viscosity ($ML_4/212°$ F.) of from about 2 to about 150. The copolymers are preferably random copolymers which result from simultaneous copolymerization of the monomers, as is known in the art. Also included are nonfunctionalized cis-polybutadiene, ethylene-propylene-diene monomer (EPDM), emulsion SBR and natural rubber.

Initiators known in the art such as an organolithium initiator, preferably an alkyllithium initiator, can be employed to prepare the elastomer. More particularly, the initiators used in the present invention include N-lithiohexamethyleneimine, organolithium compounds such as n-butyllithium, tributyltin lithium, dialkylaminolithium compounds such as dimethylaminolithium, diethylaminolithium, dipropylaminolithium, dibutylaminolithium and the like, dialkylaminoalkyllithium compounds such as diethylaminopropyllithium and the like, and trialkyl stanyl lithium, wherein the alkyl group contains 1 to about 12 carbon atoms, preferably 1 to about 4 carbon atoms.

Polymerization is usually conducted in a conventional solvent for anionic polymerizations such as the various cyclic and acyclic hexanes, heptanes, octanes, pentanes, their alkylated derivatives, and mixtures thereof. Other techniques for polymerization, such as semi-batch and continuous polymerization may be employed. In order to promote randomization in copolymerization and to increase vinyl content, a coordinator may optionally be added to the polymerization ingredients. Amounts range between 0 to 90 or more equivalents per equivalent of lithium. The amount depends upon the amount of vinyl desired, the level of styrene employed and the temperature of the polymerizations, as well as the nature of the specific polar coordinator employed.

Compounds useful as coordinators are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); THF; THF oligomers; linear and cyclic oligomeric oxolanyl alkanes, such as 2-2'-di(tetrahydrofuryl) propane, di-piperidyl ethane, hexamethylphosphoramide, N-N'-dimethylpiperazine, diazabicyclooctane, diethyl ether, tributylamine and the like. Details of linear and cyclic oligomeric oxolanyl coordinators can be found in U.S. Pat. No. 4,429,091, owned by the Assignee of record, the subject matter of which is incorporated herein by reference.

Polymerization is usually begun by charging a blend of the monomer(s) and solvent to a suitable reaction vessel, followed by the addition of the coordinator and the initiator solution previously described. Alternatively, the monomer and coordinator can be added to the initiator. The procedure is carried out under anhydrous, anaerobic conditions. The reactants are heated to a temperature of from about 10° to 150° C. and are agitated for about 0.1 to 24 hours. After polymerization is complete, the product is removed from the heat and terminated in one or more ways.

To terminate the polymerization, a terminating agent, coupling agent or linking agent may be employed, all of these agents being collectively referred to herein as "terminating agents". Certain of these agents may provide the resulting polymer with a multifunctionality. That is, the polymers initiated according to the present invention, carry at least one amine functional group as discussed hereinabove, and may also carry a second functional group selected and derived from the group consisting of terminating agents, coupling agents and linking agents.

Examples of terminating agents according to the present invention include those commonly employed in the art, including hydrogen, water, steam, an alcohol such as isopropanol, 1,3-dimethyl-2-imidazolidinone (DMI), carbodiimides, N-methylpyrrolidine, cyclic amides, cyclic ureas, isocyanates, Schiff bases, 4,4'-bis(diethylamino) benzophenone, and the like. Other useful terminating agents may include those of the structural formula $(R_1)_a ZX_b$, wherein Z is tin or silicon. It is preferred that Z is tin. $R_1$ is an alkyl having from about 1 to about 20 carbon atoms; a cycloalkyl having from about 3 to about 20 carbon atoms; an aryl having from about 6 to about 20 carbon atoms; or, an aralkyl having from about 7 to about 20 carbon atoms. For example, $R_1$ may include methyl, ethyl, n-butyl, neophyl, phenyl, cyclohexyl or the like. X is a halogen, such as chlorine or bromine, or an alkoxy (—$OR_1$), "a" is from 0 to 3, and "b" is from about 1 to 4; where a+b=4. Examples of such terminating agents include tin tetrachloride, $(R_1)_3SnCl$, $(R_1)_2SnCl_2$, $R_1SnCl_3$, and $R_1SiCl_3$ as well as methyltriphenoxysilane ($MeSi(OPh_3)$).

The terminating agent is added to the reaction vessel, and the vessel is agitated for about 1 to about 1000 minutes. As a result, an elastomer is produced having an even greater affinity for silica compounding materials, and hence, even further reduced hysteresis. Additional examples of terminating agents include those found in U.S. Pat. No. 4,616,069 which is herein incorporated by reference. It is to be understood that practice of the present invention is not limited solely to these terminators inasmuch as other compounds that are reactive with the polymer bound lithium moiety can be selected to provide a desired functional group.

Quenching is usually conducted by stirring the polymer and quenching agent for about 0.05 to about 2 hours at temperatures of from about 30° to 120° C. to ensure complete reaction. Polymers terminated with a functional group as discussed hereinabove, can be subsequently quenched with alcohol or other quenching agents as described hereinabove.

Lastly, the solvent is removed from the polymer by conventional techniques such as drum drying, extruder drying, vacuum drying or the like, which may be combined with coagulation with water, alcohol or steam, thermal desolventization, or any other suitable method. If coagulation with water or steam is used, oven drying may be desirable.

The elastomeric polymers can be utilized as 100 parts of the rubber in the treadstock compound or, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epiclorohydrin rubbers, chlorinated polyethylene rubbers, chlorosulfonated polyethylene rubbers, hydrogenated nitrile rubber, tetrafluoroethylene/propylene rubber and the like. When the polymers discussed hereinabove are blended with conventional rubbers, the amounts can vary widely with a range comprising about 5 to about 99 percent by weight of the total rubber. It is to be appreciated that the minimum amount will depend primarily upon the degree of reduced hysteresis that is desired.

According to the present invention, amorphous silica (silicon dioxide) is utilized as a filler for the diene polymer or copolymer elastomer-containing vulcanizable compound. Silicas are generally classed as wet-process, hydrated silicas because they are produced by a chemical reaction in water, from which they are precipitated as ultrafine, spherical particles.

These primary particles strongly associate into aggregates, which in turn combine less strongly into agglomerates. The surface area, as measured by the BET method gives the best measure of the reinforcing character of different silicas. For silicas of interest for the present invention, the surface area should be about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

Silica can be employed in the amount of about 1 part to about 100 parts per 100 parts of polymer (phr), preferably in an amount from about 5 to about 80 phr. The useful upper range is limited by the high viscosity imparted by fillers of this type. Some of the commercially available silicas which may be used include: Hi-Sil® 215, Hi-Sil® 233, and Hi-Sil® 190, all produced by PPG Industries. Also, a number of useful commercial grades of different silicas are available from De Gussa Corporation, Rhone Poulenc, and J. M. Huber Corporation.

The polymers can be compounded with all forms of carbon black in amounts ranging from about 2 to about 50 parts by weight, per 100 parts of rubber (phr), with about 5 to about 40 phr being preferred. The carbon blacks may include any of the commonly available, commercially-produced carbon blacks but those having a surface area (EMSA) of at least 20 $m^2$/gram and more preferably at least 35 $m^2$/gram up to 200 $m^2$/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the Table I hereinbelow.

TABLE I

| Carbon Blacks | |
|---|---|
| ASTM Designation (D-1765-82a) | Surface Area ($m^2$/g) (D-3765) |
| N-110 | 126 |
| N-220 | 111 |
| N-339 | 95 |
| N-330 | 83 |
| N-351 | 74 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred.

The reinforced rubber compounds can be cured in a conventional manner with known vulcanizing agents at about 0.2 to about 5 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

Vulcanizable elastomeric compositions of the invention can be prepared by compounding or mixing the elastomeric polymer with silica, optionally carbon black, the silica-hydrophobating agent according to the present invention, a minimal amount of Si69, and other conventional rubber additives including for example, fillers, plasticizers, antioxidants, curing agents and the like, using standard rubber mixing equipment and procedures.

GENERAL EXPERIMENTAL

In order to demonstrate the preparation and properties of silica-filled, diene elastomer containing rubber stocks prepared according to the present invention, styrene butadiene rubber (SBR) polymers were prepared and were compounded using the formulations set forth in Tables II and III below.

Test results for the Control, C-A, using the Si69 processing aid only, and Examples 1–3 using silane processing aids according to the invention in Formulation A, are reported in Table II.

TABLE II

Formulation A for the Partial Replacement of Si69 and Physical Test Results

| Material | Amount (phr) | | | |
|---|---|---|---|---|
| Example No. | C-A | 1 | 2 | 3 |
| SBR | 100 | 100 | 100 | 100 |
| Oil | 20 | 20 | 20 | 20 |
| Silica | 60 | 60 | 60 | 60 |
| Carbon Black | 6 | 6 | 6 | 6 |
| Stearic Acid | 2 | 2 | 2 | 2 |
| Wax | 0.75 | 0.75 | 0.75 | 0.75 |
| Si-69 | 5.4 | 0.6 | 0.6 | 0.6 |
| Silane (Type) | — | Octyl Trimethoxy | Methacroyl Trimethoxy | Dimethyl Dimethoxy |
| Silane (Amount) | 0 | 4.71 | 4.99 | 3.62 |
| Tackifier | 3.5 | 3.5 | 3.5 | 3.5 |
| Antioxidant | 0.95 | 0.95 | 0.95 | 0.95 |
| Sulfur | 1.4 | 1.4 | 1.4 | 1.4 |
| Accelerators | 2.4 | 2.4 | 2.4 | 2.4 |
| Zinc Oxide | 3 | 3 | 3 | 3 |
| Physical Properties | | | | |
| $ML_{1+4}$ @ 100° C. | 93.7 | 84.7 | 93.3 | 88.8 |
| Tensile (psi) @ 23° C. | 2913 | 2216 | 2476 | 2834 |
| Tensile (psi) @ 100° C. | 1239 | 954 | 1122 | 1294 |
| % Elong. at break, 23° C. | 444 | 603 | 504 | 551 |
| % Elong. at break, 100° C. | 262 | 407 | 342 | 365 |
| Ring Tear (lb/in) @ 100° C. | 191 | 198 | 179 | 223 |
| Dispersion Index, % | 72.9 | 76.1 | 84 | 84.3 |

Test results for the Control, C-B, using the Si69 processing aid only, and Examples 4–7, using silane processing aids according to the invention in Formulation B, are reported in Table III.

TABLE III

Formulation B for the Partial Replacement of Si69 and Physical Test Results

| Material | Amount (phr) | | | | |
|---|---|---|---|---|---|
| Example No. | C-B | 4 | 5 | 6 | 7 |
| SBR | 75 | 75 | 75 | 75 | 75 |
| BR | 25 | 25 | 25 | 25 | 25 |
| Oil | 41.25 | 41.25 | 41.25 | 41.25 | 41.25 |
| Silica | 80 | 80 | 80 | 80 | 80 |
| Carbon Black | 8 | 8 | 8 | 8 | 8 |
| Stearic Acid | 1 | 1 | 1 | 1 | 1 |
| Wax | 1.5 | 1.5 | 1.5 | 1.5 | 1.5 |
| Si-69 | 7.2 | 0.8 | 0.8 | 0.8 | 0.8 |
| Silane (Type) | — | Propyl Triethoxy | 3-Chloropropyl Triethoxy | Octyl Triethoxy | i-Butyl Triethoxy |
| Silane (Amount) | 0 | 5.5 | 6.42 | 7.39 | 5.88 |
| Tackifier | 3 | 3 | 3 | 3 | 3 |
| Antioxidant | 1.17 | 1.17 | 1.17 | 1.17 | 1.17 |
| Sulfur | 2.8 | 2.8 | 2.8 | 2.8 | 2.8 |
| Accelerators | 2.4 | 2.4 | 2.4 | 2.4 | 2.4 |
| Zinc Oxide | 1.7 | 1.7 | 1.7 | 1.7 | 1.7 |
| Physical Properties | | | | | |
| $ML_{1+4}$ @ 100° C. | 64.8 | 69.2 | 96.1 | 53.8 | 93.9 |
| Tensile (psi) @ 23° C. | 2497 | 2268 | 2566 | 2400 | 2513 |
| Tensile (psi) @ 100° C. | 1453 | 1278 | 1693 | 1280 | 1379 |
| % Elong. at break, 23° C. | 487 | 614 | 544 | 612 | 649 |
| % Elong. at break, 100° C. | 386 | 486 | 487 | 467 | 499 |
| Ring Tear (lb/in) @ 100° C. | 190 | 270 | 245 | 262 | 298 |
| Dispersion Index, % | 93.1 | 80.5 | 95.7 | 87.9 | 93.3 |

A series of tests were conducted, in which the Si69 processing aid was omitted and insoluble sulfur was added, while processing Formulation B with 2 phr octyl-triethoxy silane, and 4 phr sorbitan oleate. Test conditions and results are reported for Examples 8–17 and the Control (no added insoluble sulfur), C—C, in Table IV, below. As illustrated in Table IV, the degree of cure of the composition, expressed as the 300% Modulus (psi) and/or the molecular weight between crosslinks ($M_c$, g/mol), improved as the amount of additional sulfur increased until the 300% Modulus and/or the $M_c$ are well known in the art to be indicators of the state of cure of a vulcanized elastomeric composition.

TABLE IV

Physical Properties of Formulation B with 2 phr Octyl-Triethoxy Silane,
4 phr Sorbitan Monooleate, and Insoluble Sulfur without Si69

| Sample | 8 | 9 | 10 | 11 | 12 | 13 | 14 | 15 | 16 | 17 | C—C |
|---|---|---|---|---|---|---|---|---|---|---|---|
| Insoluble S (phr) | 1.4 | 1.7 | 2 | 2.3 | 2.6 | 2.9 | 3.3 | 3.7 | 4.1 | 4.5 | 0 |
| Total S (phr) | 2.8 | 3.1 | 3.4 | 3.7 | 4 | 4.3 | 4.7 | 5.1 | 5.5 | 5.9 | 1.4 |
| Physical Test Results | | | | | | | | | | | |
| $ML_{1+4}/100°$ C. | 84 | 81.9 | 80.7 | 78.9 | 78.5 | 103.6 | 101.8 | 99.5 | 99.8 | 101.7 | 75.7 |
| Monsanto Cure @ 171° C. | | | | | | | | | | | |
| ML | 13.6 | 14.7 | 13.4 | 13 | 12.8 | 18 | 18.2 | 18 | 17.8 | 18.2 | 116 |
| MH | 33.4 | 34.8 | 37.1 | 37 | 38.3 | 46.5 | 48.3 | 50.6 | 50.8 | 53.9 | 37.37 |
| ts2 | 2:54 | 2:48 | 2:41 | 2:47 | 2:44 | 2:42 | 2:34 | 2:30 | 2:28 | 2:29 | 2:30 |
| tc90 | 10:51 | 9:50 | 9:42 | 9:28 | 9:15 | 12:05 | 11:36 | 11:11 | 10:29 | 11:11 | 10:01 |
| Ring Tensile @ 24° C. | | | | | | | | | | | |
| 100% Modulus, psi | 188 | 184 | 209 | 194 | 227 | 212 | 267 | 256 | 284 | 326 | 318 |
| 300% Modulus, psi | 494 | 485 | 592 | 556 | 667 | 670 | 792 | 765 | 872 | 988 | 1150 |
| Tensile str, psi | 1798 | 1550 | 1814 | 1548 | 1769 | 1842 | 2120 | 1757 | 1925 | 2076 | 2809 |
| % Elongation | 724 | 657 | 641 | 613 | 594 | 601 | 591 | 538 | 527 | 510 | 556 |
| Break energy, lbs/in$^2$ | 5273 | 4203 | 4835 | 4000 | 4445 | 4569 | 5196 | 4034 | 4343 | 4580 | 6596 |
| Sample | 8 | 9 | 10 | 11 | 12 | 13 | 14 | 15 | 16 | 17 | C |
| Ring Tensile @ 100° C. | | | | | | | | | | | |
| 100% Modulus, psi | 131 | 151 | 191 | 215 | 187 | 210 | 231 | 255 | 286 | 292 | 268 |
| 300% Modulus, psi | 333 | 381 | 519 | 566 | 532 | 621 | 656 | 730 | 846 | 833 | 661 |
| Tensile str, psi | 905 | 1062 | 1233 | 1162 | 983 | 1156 | 1017 | 878 | 1079 | 1042 | 1263 |
| % Elongation | 649 | 652 | 592 | 529 | 500 | 500 | 441 | 340 | 375 | 364 | 364 |
| Break Energy, lbs/in$^2$ | 2612 | 3070 | 3306 | 2850 | 2310 | 2849 | 2172 | 1565 | 1984 | 1906 | 2092 |
| Ring Tear @ 171° C., ppi | 250 | 217 | 228 | 230 | 201 | 247 | 216 | 201 | 192 | 221 | 276 |
| Pendulum Rebound 65° C. | 33.6 | 35 | 32.4 | 37.6 | 40.2 | 37.2 | 40.2 | 37.6 | 41.2 | 41.4 | 53.6 |
| Wet Stanley London, (#/std) | 56/53 | 54/53 | 56/53 | 53/53 | 57/53 | 60/54 | 62/54 | 63/54 | 64/54 | 63/54 | |
| Shore A @ 24° C. | 68 | 67 | 68 | 68 | 69 | 71 | 71 | 73 | 73 | 72 | 65 |
| Dispersion Index #1 | 85.6 | 85.5 | 86.5 | 87.1 | 88 | | | | | | 59.4 |
| Specific Gravity | 1.184 | 1.186 | 1.189 | 1.188 | 1.189 | 1.195 | 1.197 | 1.199 | 1.199 | 1.21 | 1.202 |
| Rheometries @ 7% strain | | | | | | | | | | | |
| tan δ @ 65° C. | .1978 | .1924 | .1807 | .1858 | .1789 | .1697 | .1662 | .158 | .1583 | .1503 | .1839 |
| Δ G' @ 65° C., MPa | 4.884 | 6.201 | 6.133 | 5.937 | 6.117 | 7.747 | 8.845 | 9.295 | 9.552 | 10.041 | 6.88 |
| Tensile Retraction | | | | | | | | | | | |
| $M_c \times 10^{-3}$ g/mol | 20.9 | 20.0 | 17.5 | 17.4 | 16.3 | 15.4 | | | 13.2 | 12.3 | 12.2 |

A further series of tests were conducted, in which Formulation B, described in Table III, was processed with added sulfur and a processing aid comprising 1.5 phr octyl-triethoxy silane, 0.5 phr Si69, and 4 phr sorbitan oleate. Test conductions and results are reported for Examples 18–22 in Table V, below. Table V illustrates a progressive improvement in the degree of cure of the composition, expressed as the 300% Modulus (psi) and/or the molecular weight between crosslinks $M_c$, g/mol), as the total amount of added sulfur is progressively increased.

TABLE V

Physical Properties of Formulation B with 1.5 phr Octyl-triethoxysilane,
4 phr Sorbitan, 0.5 Si69 and Insoluble Sulfur

| Sample | 18 | 19 | 20 | 21 | 22 |
|---|---|---|---|---|---|
| Insoluble S (phr) | 2.8 | 3.2 | 3.6 | 4 | 4.4 |
| Total S (phr) | 4.2 | 4.6 | 5 | 5.4 | 5.8 |
| Physical Test Results | | | | | |
| $ML_{1+4}/100°$ C. | 81.9 | 83.6 | 84.2 | 86.3 | 80.8 |
| Monsanto Cure @ 171° C. | | | | | |
| ML | 13.15 | 13.2 | 13.15 | 13.82 | 12.48 |
| MH | 41.84 | 44.62 | 44.62 | 46.58 | 46.98 |
| ts2 | 2:50 | 2:44 | 2:43 | 2:35 | 2:38 |
| tc90 | 10:15 | 10:12 | 9:12 | 9:24 | 8:59 |

TABLE V-continued

Physical Properties of Formulation B with 1.5 phr Octyl-triethoxysilane, 4 phr Sorbitan, 0.5 Si69 and Insoluble Sulfur

| Sample | 18 | 19 | 20 | 21 | 22 |
|---|---|---|---|---|---|
| Ring Tensile @ 24° C. | | | | | |
| 100% Modulus, psi | 273 | 291 | 326 | 341 | 408 |
| 300% Modulus, psi | 935 | 994 | 1112 | 1158 | 1452 |
| Tensile str, psi | 2323 | 2183 | 2112 | 2012 | 2497 |
| % Elongation | 582 | 537 | 483 | 461 | 460 |
| Break Energy, lbs/in$^2$ | 5760 | 5099 | 4545 | 4164 | 5130 |
| Ring Tensile @ 100° C. | | | | | |
| 100% Modulus, psi | 251 | 251 | 287 | 307 | 311 |
| 300% Modulus, psi | 826 | 798 | 933 | 1030 | 998 |
| Tensile str, psi | 1326 | 1215 | 1255 | 1229 | 1113 |
| % Elongation | 444 | 428 | 388 | 350 | 329 |
| Break Energy, lbs/in$^2$ | 2720 | 2439 | 2306 | 2069 | 1800 |
| Ring Tear @ 171° C., psi | 240 | 230 | 201 | 219 | 206 |
| Pendulum Rebound 65° C. | 37.2 | 39 | 42.8 | 39.4 | 42.4 |
| Wet Stanley London (#/std) | 64/53 | 61/53 | 64/53 | 65/53 | 65/53 |
| Shore A, @ RT | 72 | 71 | 72 | 74 | 73 |
| Specific Gravity | 1.195 | 1.196 | 1.197 | 1.197 | 1.202 |
| Rheometries @ 7% strain | | | | | |
| tan δ 65° C. | 0.1577 | 0.1528 | 0.1444 | 0.1384 | 0.1533 |
| Δ G' @ 65° C., MPa | 6.89 | 6.798 | 6.676 | 6.285 | 7.789 |
| Tensile Retraction Mc, × 10$^{-3}$ g/mol | 12.6 | 12.4 | 11.1 | 10.4 | 9.7 |

The present invention can thus further utilize the presence of an ester of a fatty acid or an ester of a polyol as a processing aid to replace the silane Si69 to give equal processability of the vulcanizable compound, and better hot tear strength and lower hysteresis of the vulcanized rubber stock, without loss of the other measured physical properties.

The further processing aid, such as the preferred sorbitan oleate, is air stable and does not decompose. The sorbitan oleate is lower in cost and more storage stable than Si69, and when used with a silica filler and a silane terminated polymer, gives similar reduction of ML$_4$, and tan δ with an increase in tear strength.

The additional processing aids useful according to the present invention include esters of fatty acids or esters of polyols. Representative examples include the sorbitan oleates, such as sorbitan monooleate, dioleate, trioleate and sesquioleate, as well as sorbitan esters of laurate, palmate and stearate fatty acids, and the polyoxyethylene derivatives of each, and other polyols, including glycols such as polyhydroxy compounds and the like. Of these, sorbitan monooleate is preferred.

It is therefore demonstrated that the present invention provides a means for improving the processability of formulations of diene polymer elastomers with silica-filler, reducing the viscosity of silica-filled elastomeric vulcanizable. It is further demonstrated that the present invention provides vulcanizable silica-filled elastomeric compounds having enhanced physical properties.

It should be appreciated that the present invention is not limited to the specific embodiments described above, but includes variations, modifications and equivalent embodiments defined by the following claims.

What is claimed is:

1. A process for the preparation of a silica-filled, vulcanized elastomeric compound comprising:

mixing an elastomer with a reinforcing filler selected from the group consisting of silica and mixtures thereof with carbon black, from zero to less than about 1 percent by weight of bis(3-triethoxysilylpropyl) tetrasulfide, based on the weight of the silica, an alkylalkoxysilane, a processing aid selected from the group consisting of fatty acid esters of sorbitan, polyoxyethylene derivatives of fatty acid esters of sorbitan, and mixtures thereof, and a cure agent comprising an effective amount of sulfur to provide a satisfactory cure of the compound; and effecting vulcanization.

2. The process of claim 1, wherein the elastomer is a diene monomer homopolymer or a copolymer or a terpolymer of a diene and at least one monomer selected from the group consisting of monovinyl aromatic monomers and triene monomers.

3. The process of claim 2, wherein the elastomer is styrene butadiene rubber.

4. The process of claim 1, wherein the alkylalkoxysilane is represented by the formula $(R_1)_2Si(OR_2)_2$ or $R_1Si(OR_2)_3$, wherein each $R_1$ independently is selected from the group consisting of $C_1$ to about $C_{18}$ aliphatic, about $C_6$ to about $C_{12}$ cycloaliphatic, and about $C_6$ to about $C_{18}$ aromatic; and wherein the alkoxy groups are the same or are different, each $R_2$ independently containing from one to about 6 carbon atoms.

5. The process of claim 1, wherein the alkylalkoxysilane is selected from the group consisting of octyltriethoxysilane, octyltrimethoxysilane, hexyltrimethoxysilane, ethyltrimethoxysilane, propyltriethoxysilane, phenyltrimethoxysilane, cyclohexy-trimethoxysilane, cyclohexyltriethoxysilane, dimethyldimethoxysilane, i-butyltriethoxysilane, and mixtures thereof.

6. The process of claim 1, wherein the fatty acid ester of sorbitan is selected from the group consisting of sorbitan monooleate, sorbitan dioleate, sorbitan trioleate, sorbitan sesquioleate, sorbitan laurate, sorbitan palmitate, sorbitan stearate, and mixtures thereof.

7. The process of claim, wherein the elastomer is a copolymer of styrene butadiene rubber and butyl rubber.

8. The process of claim 1, further comprising a natural rubber.

9. The process of claim 1, wherein a portion of the sulfur comprises insoluble sulfur.

10. The process of claim 1, wherein the elastomer contains a functional group derived from a polymerization initiator.

11. The process of claim 1, wherein the elastomer contains a functional group derived from a polymerization terminating agent.

12. The process of claim 11, wherein the terminating agent is selected from the group consisting of an agent having the formula $(R_1)_a ZX_b$, wherein Z is tin or silicon; $R_1$ is selected from the group consisting of an alkyl having from one to about 20 carbon atoms, a cycloalkyl having from about 3 to about 20 carbon atoms, an aryl having from about 6 to about 20 carbon atoms, and an aralkyl having from about 7 to about 20 atoms; X is a halogen or an alkoxy group "a" is from 0 to 3, and "b" is from 1 to 4, and a+b=4.

13. The process of claim 11, wherein the functional group is a silane.

* * * * *